(12) United States Patent
Palm

(10) Patent No.: US 6,513,422 B1
(45) Date of Patent: Feb. 4, 2003

(54) APPARATUS FOR EVAPORATIVE COOLING OF A LIQUIFORM PRODUCT

(75) Inventor: Bengt Palm, Genarp (SE)

(73) Assignee: Tetra Laval Holdings & Finance S.A., Pully (CH)

(*) Notice: Subject to any disclaimer, the term of this patent is extended or adjusted under 35 U.S.C. 154(b) by 344 days.

(21) Appl. No.: 10/048,175

(22) PCT Filed: Jul. 24, 2000

(86) PCT No.: PCT/SE00/01511
§ 371 (c)(1),
(2), (4) Date: May 14, 2002

(87) PCT Pub. No.: WO01/08779
PCT Pub. Date: Feb. 8, 2001

(30) Foreign Application Priority Data

Jul. 30, 1999 (SE) .............................. 9902818

(51) Int. Cl.⁷ .............................. A23L 1/00; A23L 3/16; A23C 3/00; A23C 3/02; A23C 3/033
(52) U.S. Cl. .............................. 99/454; 99/455; 99/470; 99/472; 99/517; 261/116; 261/118
(58) Field of Search .................. 99/330, 348, 352–355, 99/359, 360, 467, 470, 472, 483, 452–455, 516, 517; 62/62, 64, 374, 375; 137/88; 239/561, 566; 261/115–118, 131, 129, 64.3; 426/521, 522

(56) References Cited

U.S. PATENT DOCUMENTS

| | | | |
|---|---|---|---|
| 3,428,413 A | * 2/1969 | Froelich | 99/454 X |
| 3,973,048 A | 8/1976 | Sollerud | |
| 4,310,476 A | * 1/1982 | Nahra et al. | 261/118 |
| 4,591,463 A | * 5/1986 | Nahra et al. | 261/116 |
| 5,152,212 A | * 10/1992 | Chauveau | 99/455 X |
| 5,284,085 A | * 2/1994 | Palm | 99/472 X |
| 5,494,691 A | 2/1996 | Sizer | |
| 5,544,571 A | * 8/1996 | Nahra et al. | 99/454 |
| 5,589,214 A | 12/1996 | Palm | |
| 5,727,452 A | * 3/1998 | Jensen | 99/454 |
| 5,941,165 A | * 8/1999 | Butte | 99/470 X |
| 5,957,037 A | * 9/1999 | Paget | 99/453 X |
| 6,142,396 A | * 11/2000 | Gallus | 62/375 X |
| 6,387,322 B1 | * 5/2002 | Gallus | 99/483 X |
| 6,401,603 B1 | * 6/2002 | Palm | 99/453 |
| 6,434,951 B2 | * 8/2002 | Later | 62/374 X |

FOREIGN PATENT DOCUMENTS

EP  0 617 897  10/1994

* cited by examiner

Primary Examiner—Timothy F. Simone
(74) Attorney, Agent, or Firm—Burns, Doane, Swecker & Mathis, L.L.P.

(57) ABSTRACT

The present invention relates to an apparatus for the evaporative cooling, or flash cooling, of a liquiform product. The apparatus includes a vacuum vessel (1) which is divided into a first (6) and a second (7) space. The two spaces (6, 7) are concentrically disposed in the vessel (1).

In the first space (6) an inlet (9) is disposed for steam-charged product, as well as an outlet (10) for the product. In the second space (7), there is provided a spillway overflow (14) for the condensed steam and uncondensable gases.

The apparatus also includes a circulation cycle for coolant liquid, comprising an outlet (18) for the coolant liquid, a centrifugal pump (20), a cooler (22) and conduits (19, 21, 24) as well as means for distributing the coolant liquid (25, 29) in the second space (7) in the vacuum vessel (1).

7 Claims, 2 Drawing Sheets

APPARATUS FOR EVAPORATIVE COOLING OF A LIQUIFORM PRODUCT

FIELD OF THE INVENTION

The present invention relates to an apparatus for evaporative cooling of a liquiform product, comprising a vacuum vessel with an inlet for steam-charged product, an outlet for the product and an outlet for condensed steam, the apparatus also including a circulation cycle for coolant liquid.

BACKGROUND OF THE INVENTION

Heat treatment of liquid food products, such as milk, is a common industrial process today. By heating the product, extended shelf life will be obtained as a result of the extermination of micro-organisms which exist in the product. In sterilisation of the food product, this is heated to a temperature exceeding 100° C. In order to rapidly heat to such temperatures, steam is employed. The heating may take place either directly or indirectly. In indirect heating, heat exchangers of different types are employed. In the direct heating, the steam is added direct to the product.

There are two types of direct heating of a liquid product, injection and infusion. In injection, steam is injected into the product in a closed system. Infusion implies that the product is finely divided and caused to pass through a steam-filled space. In both cases, the supplied steam rapidly and efficiently heats up the product to the desired temperature, and the product is then kept at this temperature for a certain, predetermined interval of time. The added steam must thereafter be removed from the product in order to avoid diluting it. This normally takes place by evaporative cooling, so-called flash cooling, in a vacuum vessel. During the process, the steam is released and condensed at the same time as the product is cooled down to the temperature it had before the heat treatment.

The evaporative cooling normally takes place in that the steam-charged product is fed under pressure into a vacuum vessel. When the product enters into the vacuum vessel, the liquid boils, the steam is released and rises up in the vessel, while the product is accumulated in the lower region of the vessel. Thus cooled, the product may be drawn off from the lower region of the vessel. The steam which, together with uncondendsable gases, leaves the product is to be condensed in order to be able to be led off to an outlet. The condensation can either take place in that the steam and the gases are fed into an additional vacuum vessel where the steam is cooled by being sprinkled with cold water, or that the steam is condensed in some form of water-cooled plate condenser or tube condenser. The plate or tube condenser may be integral in the first vacuum vessel, or alternatively be placed outside it.

The various apparatuses existing today for condensing the steam are relatively expensive to manufacture, since in the first case an extra vacuum vessel is required or alternatively some form of condenser is needed. For the conventional method of condensing the steam, a considerable quantity of coolant water is moreover consumed, which should be of good quality in order to avoid "furring" or scaling and corrosion on the plates or tubes in the condenser.

SUMMARY OF THE INVENTION

One object of the present invention is to realise an apparatus for the evaporative cooling ("flash cooling") of a liquid, where the condensation of the released steam takes place in the same vacuum vessel and where no expensive and complicated condenser is required.

A further object of the present invention is that the coolant liquid which condenses the steam is circulated in a closed cycle, which reduces the consumption of coolant water and obviates the problem inherent in furring or scaling and corrosion.

These and other objects have been attained according to the present invention in that the apparatus of the type disclosed by way of introduction has been given the characterising features that the vessel is divided into a first and second space, concentrically disposed in the vessel and open towards the upper end of the vessel, and in which the inlet and outlet for the product are placed in the first space, and that the outlet for the condensed steam is placed in the second space.

Preferred embodiments of the present invention have further been given the characterising features as set forth in the appended subclaims.

BRIEF DESCRIPTION OF THE DRAWINGS

Two preferred embodiments of the present invention will now be described in greater detail hereinbelow, with particular reference to the accompanying Drawings. In the accompanying Drawings.

DETAILED DESCRIPTION OF THE INVENTION

Figure 1:
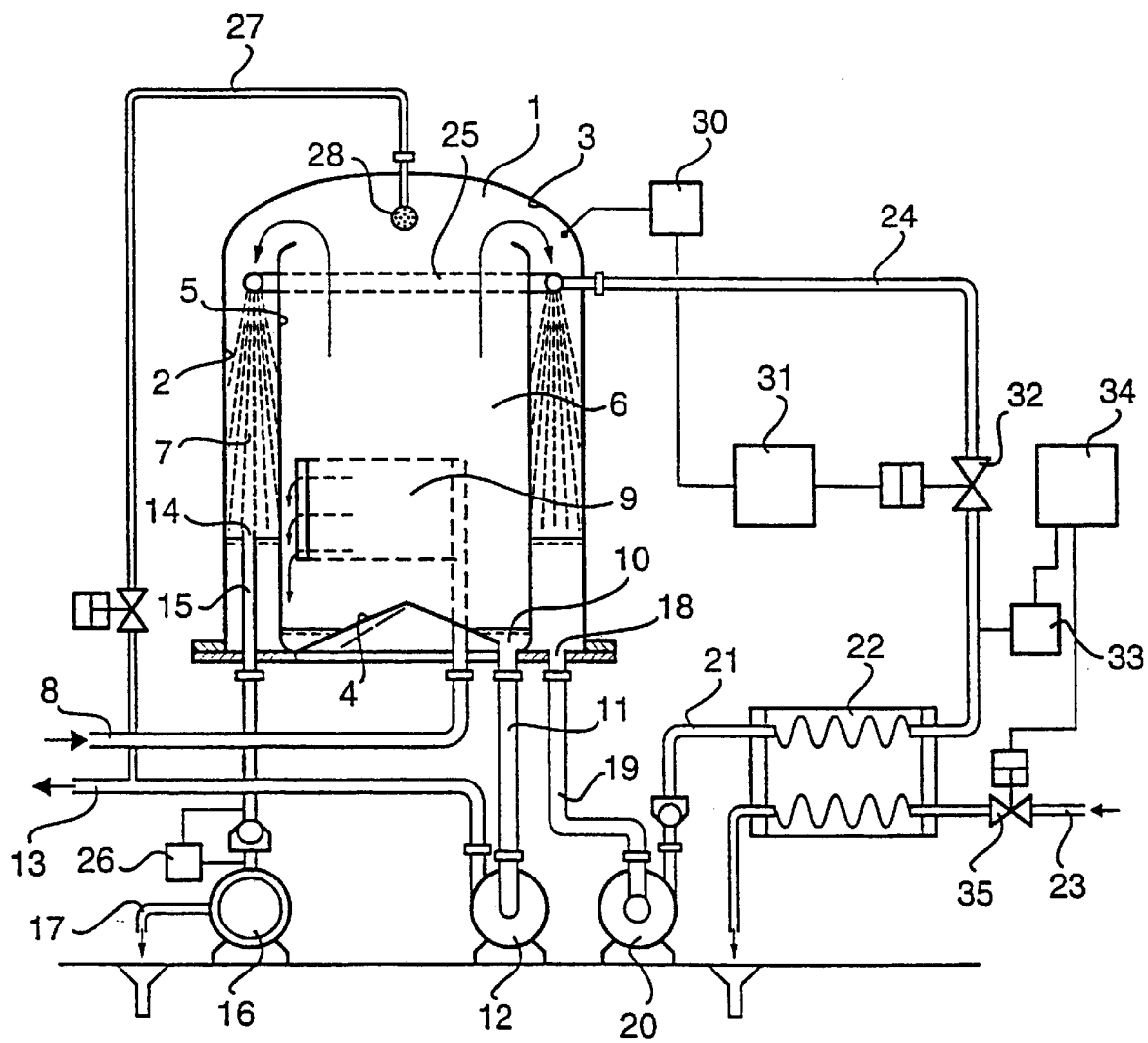
FIG. 1 shows a first preferred embodiment of the apparatus according to the present invention.
Figure 2:
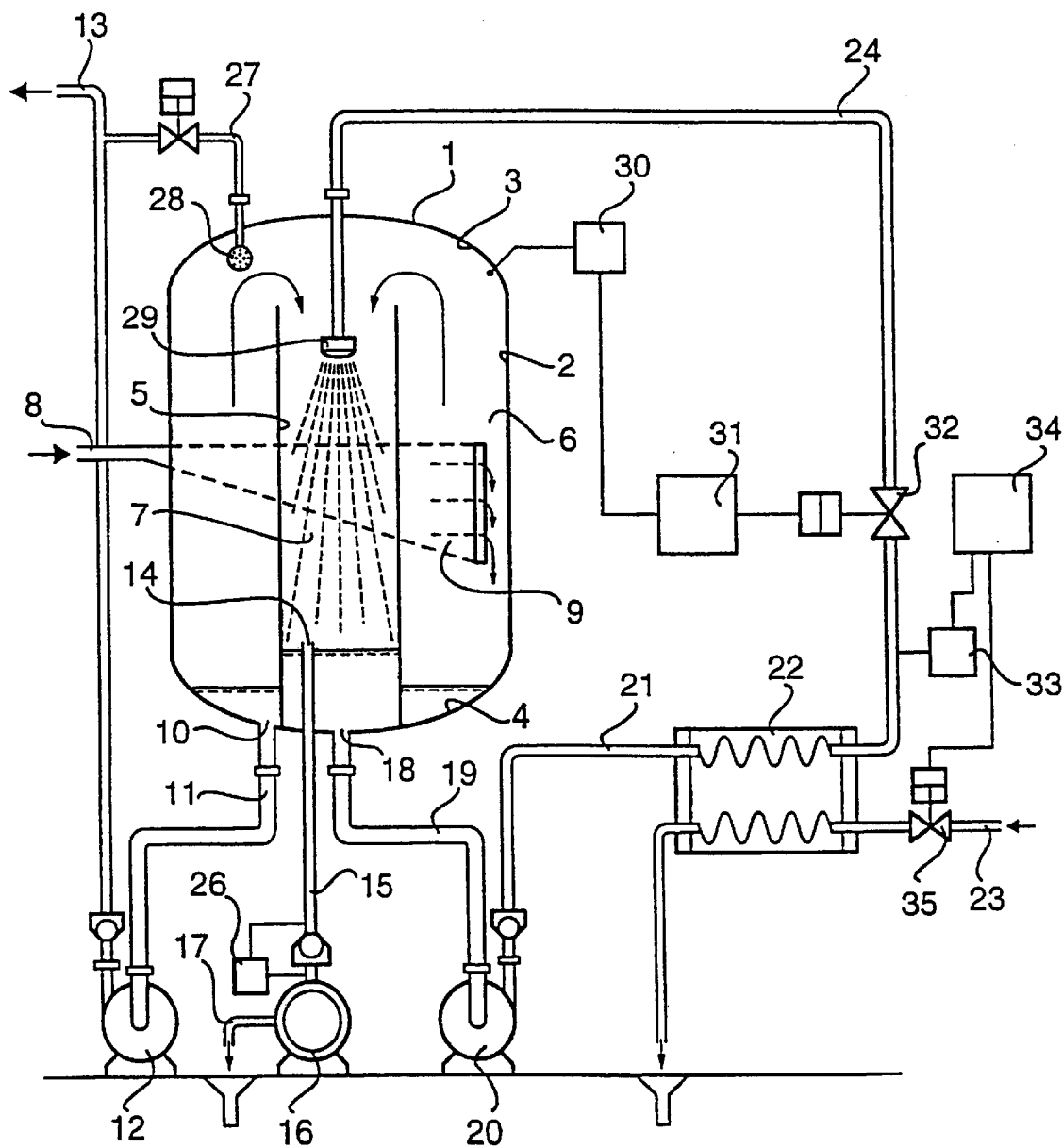
FIG. 2 shows a second preferred embodiment of the apparatus according to the present invention.

An apparatus for the evaporative cooling of a liquid product comprises a vacuum vessel 1 with an outer wall 2 and end walls 3, 4. Within the vessel 1, there is provided an additional wall 5 concentrically disposed in relation to the outer wall 2. The walls 2 and 5 together create two concentric spaces within the vessel 1, a first space 6 and a second space 7. In the first preferred embodiment of the present invention (FIG. 1), the first space 6 is placed inside the second space 7, while in the second embodiment (FIG. 2), the first space 6 is placed outside the second space 7.

The inner wall 5 is tightly secured in the lower end 4 of the vessel 1 while it terminates a distance beneath the upper end 3 of the vessel 1, so that the two spaces 6 and 7 are upwardly open. The upper end 3 of the vessel 1 is rounded, while the lower end 4 is conical inwards towards the centre of the vessel 1. The lower end 4 may also be rounded or otherwise be suitably formed for a vacuum vessel.

In to the vacuum vessel 1, there is a conduit 8 for the steam-charged, heated product. The conduit 8 discharges in an inlet 9 tangentially disposed in the first space 6 of the vessel 1. In the first preferred embodiment of the present invention (FIG. 1), this implies that the product inlet 9 is disposed in the inner wall 5 and that the product inlet 9 in the second embodiment (FIG. 2) is placed in the outer wall 2. The inlet 9 is preferably gap-shaped, so that a vertical gap is provided in the wall 2, 5 of the vessel 1.

An outlet 10 is provided in the bottom end 4 in the first space 6 for the cooled product. A conduit 11 with a centrifugal pump 12 is connected to the product outlet 10. From the pump, a conduit 13 continues out from the apparatus.

In the second space 7, there is disposed in the vessel 1 an outlet 14 for the condensed steam and uncondensable gases which depart from the product. The outlet 14 is disposed as a spillway overflow. The spillway overflow 14 is connected via a conduit 15 to a vacuum pump 16. From the vacuum pump 16, a conduit 17 goes further, normally direct to an outlet.

In the second space 7, in the lower end 4, there is also provided an outlet 18 for the coolant water. The outlet is connected to a conduit 19 with a centrifugal pump 20. From the pump 20, a conduit 21 leads to a cooler 22 which, for example, may be a plate heat exchanger. The cooler 22 is also connected to a cold water pipe 23.

After the cooler 22, there is provided a conduit 24 which discharges within the vacuum vessel 1. In the first preferred embodiment of the present invention (FIG. 1), the conduit 24 discharges in an annular conduit 25 which is provided with a number of holes distributed on the annular conduit 25. The annular conduit 25 is placed in the upper region of the second space 7 of the vessel 1. The outlet 18, the centrifugal pump 20, the cooler 22, the conduits 19, 21 and 24, as well as the annular conduit 25 together constitute a circulation cycle for the coolant water.

In the second preferred embodiment of the present invention (FIG. 2), the conduit 24 discharges in a distributor nozzle 29 which is provided with a number of holes. The distributor nozzle 29 is placed in the upper region of the second space 7 of the vessel 1. The outlet 18, the centrifugal pump 20, the cooler 22, the conduits 19, 21 and 24, as well as the distributor nozzle 29 together constitute a circulation cycle for the coolant water.

For monitoring of the apparatus, a pressure regulator 26 is connected and is placed on the conduit 15 in to the vacuum pump 16. The pressure regulator 26 monitors that the correct pressure is maintained within the vacuum vessel 1. The apparatus also includes a conduit 27 for washing. The conduit 27 terminates with a spray nozzle 28.

The product which has been heat treated before arriving at the apparatus is normally at a temperature of 70–100° C. The product is heated in that it is directly supplied with steam in an injector or infusor (not shown). The product is normally heated to a temperature of 100–150° C. and is then kept at this temperature in a buffer pipe (not shown), during a certain, predetermined interval of time which is dependent upon the treatment temperature.

After the buffer pipe, the product which is mixed with steam enters under pressure into the apparatus through the conduit 8. The steam-charged product passes into the vacuum vessel 1 through the tangential inlet 9, into the first space 6, which implies that the product, in the first preferred embodiment of the present invention (FIG. 1), will enter into the inner of the two spaces 6, 7 formed by the walls 2 and S. In the second embodiment (FIG. 2), the product enters into the outer of the two spaces 6, 7. As a result of the tangential design of the inlet, the product will follow each respective wall 5, 2 as a result of so-called cyclone effect. When the product under pressure enters into the vacuum vessel 1, the liquid will boil at the sudden pressure drop, and steam and uncondensable gases are released from the product. The heavier product falls down in the vacuum vessel 1, while the lighter steam and the uncondensable gases rise.

The product which has been freed of steam is now at a temperature which corresponds to the temperature which it had before the heat treatment, i.e. 70–100° C. The product is accumulated in the lower region of the vacuum vessel 1 and leaves it through the outlet 10. Via the conduits 11 and 13, as well as the centrifugal pump 12, the product is conveyed further to additional cooling, or alternatively to other forms of treatment.

The steam and the uncondensable gases which have risen upwards in the vacuum vessel 1 are drawn towards the second space 7 in the vessel 1. The steam and gases will here be sprinkled with coolant water from the annular conduit 25 or the distributor nozzle 29, respectively. The coolant water may have a temperature of between 10 and 40° C. The higher the temperature of the coolant water, the greater will be the quantity of coolant water which is consumed for condensing the steam.

The condensed steam, the coolant water and the uncondensable gases are gathered in the lower region of the vacuum vessel, in the second space 7. A spillway overflow 14 is disposed such that the additional condensed steam and gases depart from the vacuum vessel 1 via the spillway overflow 14. Via the conduit 15 and the vacuum pump 16, the surplus is led to outlet through the conduit 17. The pressure in the vessel 1 is kept constant by means of the pressure regulator 26 placed on the inlet to the vacuum pump 16.

The coolant water which is accumulated under the spillway overflow 14 in the lower region of the vacuum vessel 1 is included in the as good as closed circulation cycle for coolant water which is included in the apparatus. Via the outlet 18 and the conduit 19, coolant water is pumped from the vacuum vessel 1 by means of the circulation pump 20 to a cooler 22. The cooler 22 may, for example, consist of a plate heat exchanger and as coolant use is preferably made of cold water at a temperature of 10–40° C. The cold water enters into the cooler 22 through the cold water pipe 23.

After the cooler 22, the coolant water passes through the conduit 24 back into the upper region of the vacuum vessel 1. Depending upon the embodiment, the conduit 24 discharges in an annular conduit 25 or in a distributor nozzle 29, respectively. In both cases, the coolant water is distributed through small holes in the conduit 25 and in the distributor nozzle 29, respectively, and is caused once again to sprinkle on the steam and the uncondensable gases entering into the vessel 1.

For the desired temperature to be able to be maintained within the vacuum vessel 1, a temperature indicator 30 is provided in its upper region. The temperature indicator 30 emits a signal to a temperature regulator 31 which controls a valve 32 disposed on the conduit 24 where the cooled coolant water departs from the cooler 22. Through the valve 32, the quantity of coolant water which is to pass into the conduit 24 in to the annular conduit 25 or to the distributor nozzle 29, respectively, is regulated. The above-described method of regulating the temperature in the vessel 1 permits a steplessly variable product capacity in the heat treatment plant which precedes the apparatus according to the present invention. A more economical alternative, which entails a fixed product capacity, is constant flow regulation.

The coolant water is kept at the desired temperature by means of a temperature indicator 33 placed immediately in connection with the coolant water outlet from the cooler 22. The temperature indicator 33 emits a signal to a temperature regulator 34 which controls a valve 35 placed on the cold water pipe 23 in to the cooler 22. By adapting the temperature of the coolant water so that the coolant water which departs from the vacuum vessel 1 though the outlet 18 does not exceed a temperature of approximately 65° C., scaling or furring in the coolant water conduit is avoided.

As will have been apparent from the foregoing description, the present invention realises an apparatus for the evaporative cooling, or flash cooling, of a liquid product which is more economical in design than prior art apparatuses. The apparatus utilises but a single vacuum vessel, and nor is it equipped with complicated and expensive condensers. The apparatus further displays a closed circulation cycle for coolant water, which entails reduced consumption of water in the evaporative cooling.

What is claimed is:

1. An apparatus for evaporative cooling of a liquiform product, comprising a vacuum vessel with an inlet for steam-charged product, an outlet for the product, as well as an outlet for condensed steam, the apparatus also including a circulation cycle for coolant liquid, wherein the vessel is divided into a first and a second space, concentrically disposed in the vessel and open towards the upper end of the vessel, and where the inlet and outlet for the product are placed in the first space and the outlet for the condensed steam is placed in the second space.

2. The apparatus as claimed in claim 1, wherein the first space is placed inside the second space.

3. The apparatus as claimed in claim 1, wherein the first space is placed outside the second space.

4. The apparatus as claimed in claim 1, wherein the outlet for the condensed steam is a spillway overflow.

5. The apparatus as claimed in claim 1, wherein the circulation cycle for coolant liquid consists of an outlet for the coolant liquid, a centrifugal pump, a cooler and conduits as well as an annular conduit.

6. The apparatus as claimed in claim 1, wherein the circulation cycle for coolant liquid consists of an outlet for coolant liquid, a centrifugal pump, a cooler and conduits as well as a distributor nozzle.

7. The apparatus as claimed in claim 1, wherein the inlet for product is tangentially disposed in the wall and designed as a vertical gap.

* * * * *